United States Patent [19]

Ground

[11] Patent Number: 4,706,914
[45] Date of Patent: Nov. 17, 1987

[54] ATTACHING ASSEMBLY

[75] Inventor: Damon R. Ground, St. Paul, Minn.

[73] Assignee: Minnesota Mining and Manufacturing Company, Saint Paul, Minn.

[21] Appl. No.: 890,619

[22] Filed: Jul. 25, 1986

[51] Int. Cl.$^4$ .............................................. A47F 5/08
[52] U.S. Cl. .................... 248/74.3; 24/306; 24/447; 248/205.3
[58] Field of Search .................. 248/74.3, 74.4, 205.3, 248/231, 205.2; 24/306, 304, 444, 447

[56] References Cited

U.S. PATENT DOCUMENTS

| | | | |
|---|---|---|---|
| 3,516,631 | 6/1970 | Santucci | 248/205.3 X |
| 3,659,319 | 5/1972 | Erickson | 24/304 |
| 3,841,648 | 10/1974 | Meyer | 24/306 X |
| 4,322,875 | 4/1982 | Brown et al. | 24/447 |
| 4,447,934 | 5/1984 | Anscher | 248/74.3 X |
| 4,576,664 | 3/1986 | Delahunty | 248/205.3 X |
| 4,596,540 | 6/1986 | F'Geppert | 24/306 X |
| 4,609,171 | 9/1986 | Matsui | 248/74.3 |

Primary Examiner—Robert W. Gibson, Jr.
Attorney, Agent, or Firm—Donald M. Sell; James A. Smith; William L. Huebsch

[57] ABSTRACT

An attachment assembly for releasably attaching an object such as a wire bundle to a surface such as on the firewall of an automobile. The assembly comprises a flexible polymeric strap, fastener portions adapted for releasable engagement attached at the ends of the strap which can secure the strap around an object, and attachment means comprising a layer of pressure sensitive adhesive along the strap for attaching the strap to a surface. The fastener portions are positioned or attached so that forces applied by the object tending to separate them place interacting parts of the fastener portions in shear or tension rather than in peel.

10 Claims, 4 Drawing Figures

ATTACHING ASSEMBLY

TECHNICAL FIELD

The present invention relates to attachment assemblies for releasably attaching objects such as wire bundles to surfaces such as on the firewalls of automobiles.

BACKGROUND ART

Attachment assemblies are known by which objects such as wire handles can be attached to surfaces. One such type of attachment assembly comprises a flexible strap, a fastener comprising portions adapted for releasable engagement attached on opposite ends of the strap, and means for attaching the strap to a surface. Typically the strap is attached to a surface and is then wrapped around the object to be held in place and the fastener portions are engaged. In known prior art fastener assemblies of this type, however, forces tending to dislodge the object from the fastener assembly tend to peel apart the fastener portions, which peeling is the easiest way of separating the fastener portions. Thus the fastener assembly may not be as secure as is desired due to the limited amount of resistance to such peel forces that can easily be designed into many fasteners.

DISCLOSURE OF THE INVENTION

The present invention provides attachment assemblies for attaching objects such as wire bundles to surfaces such as on the firewalls of automobiles in which forces tending to dislodge the objects place fastener portions either in shear parallel to their backings or in tension at right angles to their backings, which shear or tension allows the fastener portions to resist larger dislodging forces than can the same fastener portions when the dislodging forces tend to peel the fastener portions apart.

In one embodiment of the attachment assembly according to the present invention, the assembly comprises a flexible polymeric strap, fastener portions adapted for releasable engagement (e.g., fastener portions each comprising a plurality of stems projecting at generally a right angle from a major surface of the strap and having enlarged generally semispherical heads on their distal ends adapted to releasably engage with each other; or a first fastener portion comprising a plurality of stems projecting at generally a right angle from a major surface of the strap and having heads on their distal portions with hook-like projections projecting along the stems toward the strap and a second fastener portion comprising a plurality of loops adapted to engage around the heads and the projections), which fastener portions include a first fastener portion attached on a first surface of the strap adjacent a first end, and a second fastener portion attached on a second surface of the strap adjacent a second end, and attachment means for attaching the strap to a surface comprising a layer of pressure sensitive adhesive along the first surface of the strap. The strap can be attached to a surface by the layer of adhesive and then wrapped around an object such as a wire bundle whereupon the fastener portions are engaged. Forces then tending to dislodge the object held by the attachment assembly place the fastener portions in shear parallel to the strap surfaces on which they are mounted so that the fastener portions can provide much more holding power than they could if forces tending to separate them tended to peel them apart.

In another embodiment of the attachment assembly according to the present invention, the assembly comprises a flexible polymeric strap, fastener portions adapted for releasable engagement (which could be of the types described in the preceding paragraph) including a first fastener portion attached on a first surface of the strap adjacent a first end, and a second fastener portion also attached on the first surface of the strap adjacent a second end, and attachment means adapted for adhering the strap to a surface comprising a layer of pressure sensitive adhesive along a second surface of the strap adjacent its second end. The first fastener portion includes a backing attached to the strap from its end adjacent the first end of the strap to a location generally central along its backing and is unattached to the strap from that central location to the opposite end of the backing. Thus after the strap is adhered to a surface and the fastener portions are engaged with the strap encircling an object, tension in the strap caused by forces tending to dislodge the object will cause bending of the strap at generally the center of the backing of the first fastener portion and the application of forces generally at a right angle to that backing tending to simultaneously separate all engaged parts of the fastener portions. Such forces place the fastener portions in tension along their entire lengths in a direction at right angles to their backings so that the fastener portions can again provide much more holding power than if forces tending to separate them tended to peel them apart.

BRIEF DESCRIPTION OF THE DRAWING

The present invention will be further described with reference to the accompanying drawing wherein like numerals refer to like parts in the several views, and wherein.

DETAILED DESCRIPTION

Figure 1:
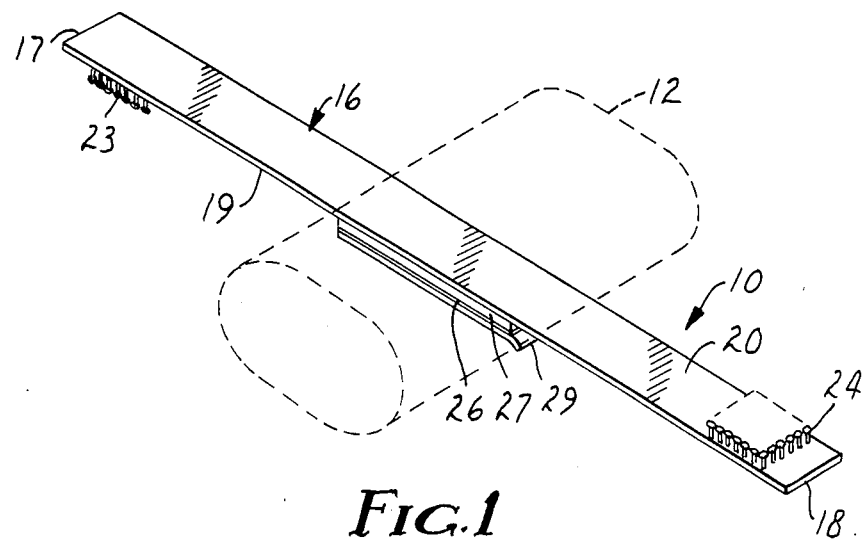
FIG. 1 is a view in perspective of a first embodiment of an attachment assembly according to the present invention in an open position and shown extending transversely under an object (shown in phantom outline) with which the attachment assembly may be engaged.
Figure 2:
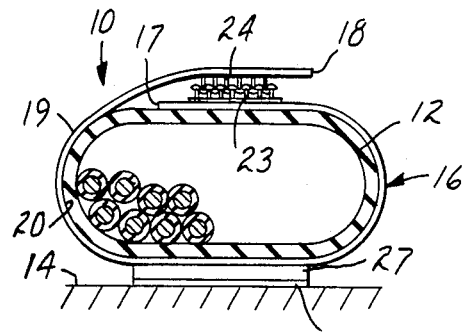
FIG. 2 is a side view of the attachment assembly of FIG. 1 closed around an object and attached to a surface.

Referring now to FIGS. 1 and 2 there is shown a first embodiment of an attachment assembly according to the present invention generally designated by the reference numeral 10.

The attachment assembly 10 is adapted for releasably attaching an object 12 such as a wire bundle to a surface 14 such as on the firewall of an automobile. The assembly 10 comprises a flexible polymeric strap 16 having first and second ends 17 and 18 and first and second major surfaces 19 and 20. The attachment assembly includes fastener portions adapted for releasable engagement including a first fastener portion 23 attached on the first surface 19 of the strap 16 adjacent its first end 17, and a second fastener portion 24 attached on the second surface 20 of the strap 16 adjacent its second end 18. Also included are attachment means for attaching the strap 16 to a surface such as the surface 14 comprising a layer of pressure sensitive adhesive 26 coated on the outer surface of a layer 27 of soft flexible foam (e.g., the acrylic foam tape coated on both sides by pressure sensitive adhesive sold under the designation 4210 by Minnesota Mining and Manufacturing Company, St. Paul, Minn.) adhered centrally along the first surface 19 of the strap 16, and covered by a release liner 29 (FIG. 1) prior to use of the fastener assembly 10.

In the attachment assembly 10 the first and second fastener portions 23 and 24 each comprise a plurality of stems projecting at about a right angle from a backing (which backing may be provided by the polymeric strap 16 as illustrated for the fastener portion 24, or by a separate polymeric sheet as illustrated for the fastener portion 23, whereupon the backing is attached to the strap 16 as by sonic welding), which stems have enlarged generally semispherical heads on their distal ends, the fastener portions 23 and 24 being preferably made in accordance with the method described in U.S. Pat. No. 4,290,174 incorporated herein by reference. Such fastener portions 23 and 24 can have heads arrayed in a manner described in U.S. Pat. No. 4,322,875 also incorporated herein by reference, so that when closed as shown in FIG. 2 forces tending to separate the fastener portions 23 and 24 will tend to pull the arrays of headed stem on the fastener portions through each other in directions at right angles to the stems and parallel to the backings of the fastener portions 23 and 24 and major surfaces 19 and 20 at the ends 17 and 18 of the strap on which the fastener portions are attached, thereby tending to shear the headed stems relative to each other so that they will strongly resist separation by such forces. The fastener portions 23 and 24, however, can be more easily manually peeled apart to afford opening of the fastener.

Figure 3:
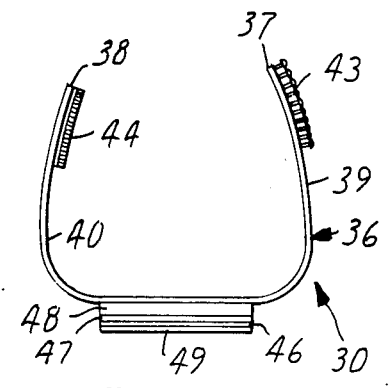
FIG. 3 is a second embodiment of an attachment assembly according to the present invention shown in an open position.

Referring now to FIG. 3 there is shown a second embodiment of an attachment assembly according to the present invention generally designated by the reference numeral 30.

The attachment assembly 30 is also adapted for releasably attaching an object such as a wire bundle to a surface such as on the firewall of an automobile. The assembly 30 comprises a flexible polymeric strap 36 having first and second ends 37 and 38 and first and second major surfaces 39 and 40. The attachment assembly includes fastener portions adapted for releasable engagement including a first fastener portion 43 attached on the first surface 40 of the strap 36 adjacent its first end 37, and a second fastener portion 44 attached on the second surface 38 of the strap 36 adjacent its second end 38. Also included are attachment means for attaching the strap 36 to a surface comprising a layer of pressure sensitive adhesive 46 coated on the outer surface of a layer 47 of soft flexible foam attached on one surface of a rigid polymeric block 48, the other surface of which block 48 is attached centrally along the first surface 39 of the strap 36, which adhesive 46 is covered by a release liner 49 prior to use of the fastener assembly 30. The presence of the block 48 between the strap 36 and the layer of pressure sensitive adhesive 46 helps to restrict forces tending to peel the layer of adhesive 46 from a surface to which it has been adhered due to the weight of an object around which the strap 36 is held by the fastener portions 43 and 44. In the attachment assembly 30 the first fastener portion 43 comprises a plurality of stems projecting at about a right angle from the first major surface 39 of the strap 36 and having enlarged generally semispherical heads on their distal ends, which heads include hook-like projections projecting along the stems toward the backing, the fastener portions 43 being made in accordance with the method described in U.S. Pat. No. 4,454,183 incorporated herein by reference. The second fastener portion 44 comprises a plurality of loops projecting from a backing attached to the strap 36, which loops are adapted to engage around the heads and hook-like projections of the first fastener portions 43 so that when the fastener portions 43 and 44 are engaged, forces tending to separate the fastener portions 43 and 44 will tend to pull the loops on the fastener portions 44 sideways off the headed stems on the fastener portion 43, or tend to shear the headed stems and loops relative to each other so that they will strongly resist separation by such forces since the loops engaged around the headed stems must typically be broken to afford opening of the fastener.

Figure 4:
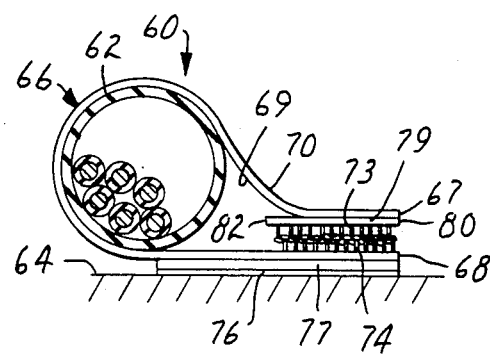
FIG. 4 is a third embodiment of an attachment assembly according to the present invention shown closed around an object and attached to a surface.

Referring now to FIG. 4 there is shown a third embodiment of an attachment assembly according to the present invention generally designated by the reference numeral 60.

The attachment assembly 60 is adapted for releasably attaching an object 62 such as a wire bundle to a surface 64 such as on the firewall of an automobile. The assembly 60 comprises a flexible polymeric strap 66 having first and second ends 67 and 68 and first and second major surfaces 69 and 70, and attachment means for attaching the strap 66 to a surface such as the surface 64 comprising a layer of pressure sensitive adhesive 76 coated on the outer surface of a layer 77 of soft flexible foam attached adjacent the second end 68 and along the second surface 70 of the strap 66. The attachment assembly also includes fastener portions adapted for releasable engagement including a first fastener portion 73 attached on the first surface 69 of the strap 66 adjacent its first end 67, and a second fastener portion 74 also attached on the first surface 69 of the strap 66 adjacent its second end 68.

The first and second fastener portions 73 and 74 each comprise a plurality of stems projecting at about a right angle from a backing provided by or attached to the strap 66 as by sonic welding and having enlarged generally semispherical heads on their distal ends, which fastener portions 73 and 74 are made in accordance with the method described in U.S. Pat. No. 4,290,174. Such fasteners can have heads arrayed in a manner so that when closed as shown in FIG. 4 forces tending to simultaneously separate the engaged heads of the fastener portions 73 and 74 in a direction normal to the backing of the fastener portions 73 and 74 requires significant tension in the fastener portions parallel to their stems so that they will strongly resist separation by such forces while being more easily manually peeled apart to afford opening of the fastener 60.

The first fastener portion 73 includes the backing 79 attached to the strap 66 from its end 80 adjacent the first end 67 of the strap 66 to a location generally central along the backing 79 and is unattached to the strap 66 from that central location to the opposite end 82 of the backing 79. Thus after the strap 66 is adhered to the surface 64 and the fastener portions 73 and 74 are engaged with the strap 66 encircling the object 62, tension in the strap 66 caused by forces tending to dislodge the object 62 will cause bending of the strap 66 at generally the center of the backing 79 of the first fastener portion 73 and the application of forces generally at a right angle to that backing 79 tending to simultaneously separate all engaged parts of the fastener portions 73 and 74. Such forces place the fastener portions 73 and 74 in tension along their entire lengths in a direction at right angles to their backings so that the fastener portions 73 and 74 can provide much more holding power than if forces tending to separate them tended to peel them apart, and yet the fastener portions 73 and 74 can more easily be manually peeled apart if a person desires to remove the object 62 from the strap 66.

The present invention has now been described with reference to one embodiment thereof. It will be apparent to those skilled in the art that many changes can be made in the embodiment described without departing from the scope of the present invention. For example, if desired a rigid block such as the block 48 could be used between the strap and layer of pressure sensitive adhesive on any of the attaching assemblies illustrated. Any of the illustrated pairs of fastener portions could be used in any of the attaching assemblies, and the fastener portion 44 with its loops could be used in combination with a fastener portion including semispherical heads on stems (e.g., fastener portion 23). Additionally, the layer of pressure sensitive adhesive on the attachment assembly 60 could be adhered along a central portion of the strap 66 and both fastener portions 73 and 74 could have backings separate from the strap 66 attached to the strap 66 in the manner the backing 79 of the first fastener portion 73 is attached in the illustrated embodiment to provide a similar result. Thus the scope of the present invention should not be limited to the structures described in this application, but only by structures described by the language of the claims and the equivalents of those structures.

I claim:

1. An attachment assembly for releasably attaching an object such as a wire bundle to a surface such as on the firewall of an automobile, said assembly comprising a flexible polymeric strap having first and second ends and first and second major surfaces, a fastener comprising fastener portions adapted for releasable engagement including a first fastener portion attached on said first surface of said strap adjacent said first end and a second fastener portion attached on said first surface of said strap adjacent said second end, said first fastener portion including a backing having a first length between two ends longitudinally along said strap, and being attached to said strap from the end of said first fastener portion adjacent the first end of the strap to a location generally central along the backing and being unattached to said strap from said generally central location to the end of the backing opposite said first end of the strap so that tension in said strap will cause bending of said strap at generally the center of said backing and the application of forces generally at a right angle to said backing tending to separate said fastener portions, and attachment means adapted for attaching said strap to a surface comprising a layer of pressure sensitive adhesive along said second surface of said strap.

2. An attachment assembly according to claim 1 wherein said first and second fasteners portions each comprise a plurality of stems projecting at generally a right angle from said strap and having enlarged generally semi-spherical heads on their distal ends.

3. An attachment assembly according to claim 1 wherein said first fastener portion comprises a plurality of stems projecting at generally a right angle from said strap and having heads on their distal portions, said heads including hook-like projections projecting along said stems toward said strap, and said second fastener portion comprises a plurality of loops adopted to engage around said heads and said projections.

4. An attachment assembly according to claim 1 wherein said attachment means comprises a layer of resiliently flexible foam between said layer of pressure sensitive adhesive and said strap.

5. An attachment assembly according to claim 1 wherein said attachment means comprises a rigid plate-like member between said strap and said layer of pressure sensitive adhesive.

6. An attachment assembly for releasably attaching an object such as a wire bundle to a surface such as on the firewall of an automobile, said assembly comprising a flexible strap having first and second ends and first and second major surfaces, a fastener comprising fastener portions adapted for releasable engagement including a first fastener portion attached on said first surface of said strap adjacent said first end and a second fastener portion attached on said first surface of said strap adjacent said second end, said first fastener portion including a backing having a first length between two ends longitudinally along said strap, and being attached to said strap from the end of said first fastener portion adjacent the first end of the strap to a location generally central along the backing and being unattached to said strap from said generally central location to the end of the backing opposite said first end of the strap so that tension in said strap will cause bending of said strap at generally the center of said backing and the application of forces generally at a right angle to said backing tending to separate said fastener portions, and attachment means adapted for attaching said strap to a surface along said second surface of said strap.

7. An attachment assembly according to claim 6 wherein said first and second fasteners portions each comprise a plurality of projecting stems having enlarged generally semi-spherical heads on their distal ends.

8. An attachment assembly according to claim 6 wherein one of said fastener portions comprises a plurality of projecting stems having heads on their distal portions, said heads including hook-like projections projecting along said stems toward said strap, and the other of said fastener portions comprises a plurality of loops adopted to engage around said heads and said projections.

9. An attachment assembly according to claim 6 wherein said attachment means comprises a layer of pressure sensitive adhesive and a layer of resiliently flexible foam between said layer of pressure sensitive adhesive and said strap.

10. An attachment assembly according to claim 6 wherein said attachment means comprises a layer of pressure sensitive adhesive and a rigid plate-like member between said strap and said layer of pressure sensitive adhesive.

* * * * *